United States Patent Office.

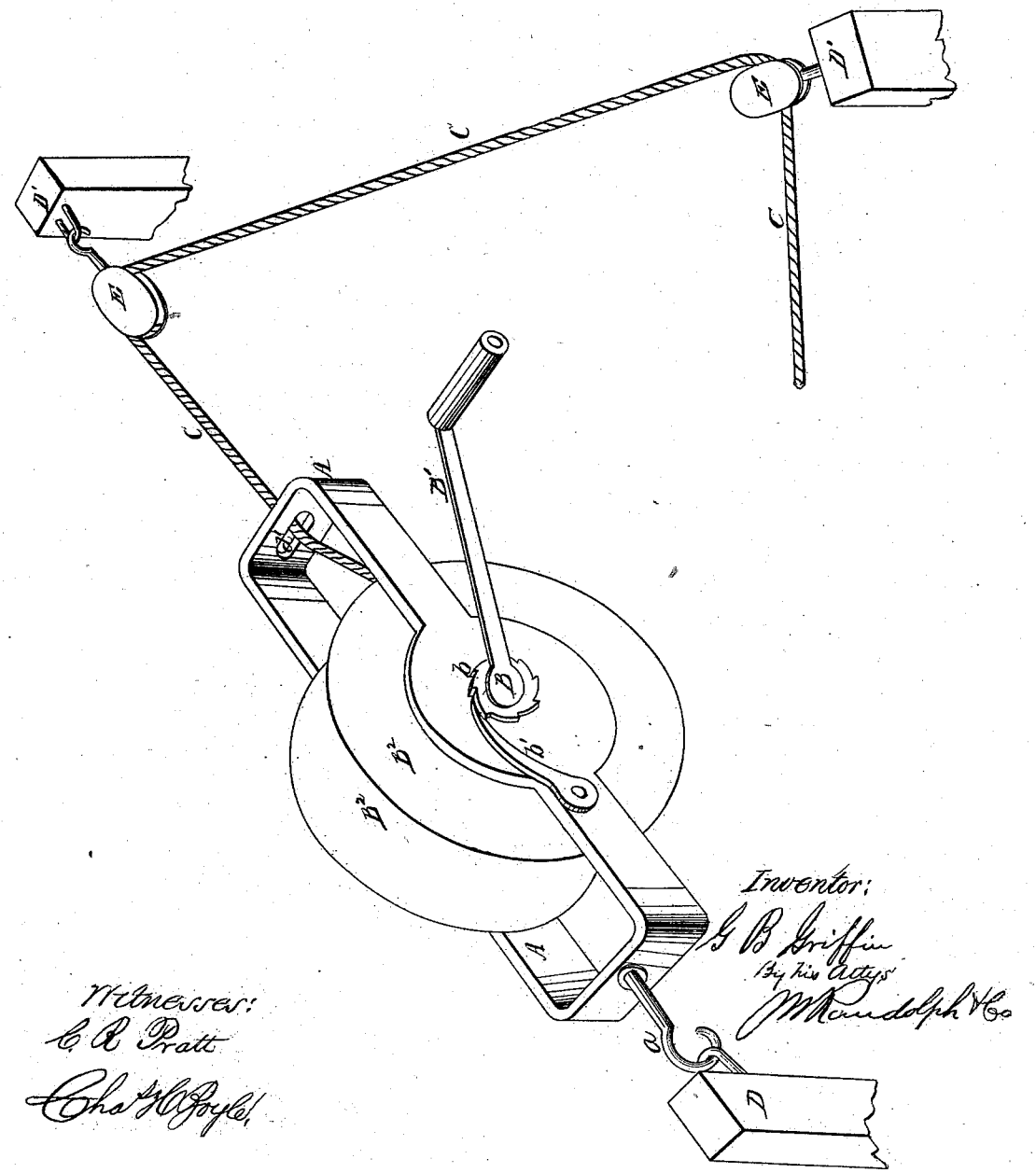

G. B. GRIFFIN, OF MADISON, WISCONSIN.

Letters Patent No. 67,872, dated August 20, 1867.

IMPROVED CLOTHES-LINE REEL.

*The Schedule referred to in these Letters Patent and making part of the same.*

TO ALL WHOM IT MAY CONCERN:

Be it known that I, G. B. GRIFFIN, of Madison, Dane county, Wisconsin, have invented a new Clothes-Line Reel; and I do hereby declare that the following is a full and clear description thereof, reference being had to the accompanying drawings, and to the letters of reference marked thereon.

The nature of this invention consists in the combination of a reel fixed to a portable frame, and certain blocks and sheaves to be hooked to posts fixed in the yard where it is to be used.

To enable others skilled in the art to make and use my improved reel, I will proceed to describe its construction and operation.

The accompanying drawings represent in perspective one of the said reels and its accompanying blocks, with a line and the posts which are to be placed in the yard. A is a frame of wood or metal, the latter material being preferred as being lighter and stronger. Across this frame, and having bearings in it, is placed a shaft, B, which is to be turned by means of the crank $B^1$. The ratchet $b$ and pawl $b'$ are applied to the shaft B to take up its motion and hold it in place when wound up. There are two disks, $B^2$, attached to the shaft B, just inside of the frame A; and between these two disks the line C is attached to the shaft, and it may be there wound up around it by turning the crank $B^1$. A hook, $a$, secured to one end of the frame A, is to be used to attach the frame A to a permanent fixture, as a post, D. The line C passes through a slot, $a'$, in the forward end of the frame A, and thence around sheaves in the blocks E E, and finally is to be fastened to some stationary hook (not shown) at its other end. The blocks E E should be provided with hooks so as to be readily attached to posts or other fixtures $D' D'$. When this line is to be put up the hook $a$ is to be secured to its proper fastening, and then the line run out and the blocks E E attached to their proper supports. There may be as many of the blocks E E as occasion may require, and when the line is to be taken down they will simply be unhooked from the posts and wound up with the line. After the blocks E E have been hooked to their posts, and the outer end of the line securely fastened, the latter may be tightened up as much as required, by winding up the crank $B^1$, and throwing the pawl on to the ratchet so as to take up the slack. Any woman can thus readily put up a line and render it properly tight, and then take the whole down again when not in use and shield it from the weather.

Having described my invention, what I claim is—

The frame A, the reel B $B^1$ $B^2$, the line C, and the blocks E E, when combined and arranged as described and set forth.

G. B. GRIFFIN.

Witnesses:
M. RANDOLPH,
C. R. PRATT.